United States Patent
Winger et al.

(10) Patent No.: US 7,345,708 B2
(45) Date of Patent: Mar. 18, 2008

(54) METHOD AND APPARATUS FOR VIDEO DEINTERLACING AND FORMAT CONVERSION

(75) Inventors: Lowell L. Winger, Waterloo (CA); Yunwei Jia, Milton (CA); Aaron G. Wells, Oakland, CA (US); Elliot N. Linzer, Suffern, NY (US); Simon Booth, Milton (CA); Guy Cote, Elora (CA)

(73) Assignee: LSI Logic Corporation, Milpitas, CA (US)

( * ) Notice: Subject to any disclaimer, the term of this patent is extended or adjusted under 35 U.S.C. 154(b) by 482 days.

(21) Appl. No.: 10/744,729

(22) Filed: Dec. 23, 2003

(65) Prior Publication Data

US 2005/0134730 A1 Jun. 23, 2005

(51) Int. Cl.
 *H04N 7/01* (2006.01)
 *H04N 11/20* (2006.01)
 *G06K 9/40* (2006.01)

(52) U.S. Cl. ............... 348/448; 348/452; 348/458; 382/262

(58) Field of Classification Search ........... 348/448, 348/452, 458; 382/262
 See application file for complete search history.

(56) References Cited

U.S. PATENT DOCUMENTS

| | | | | |
|---|---|---|---|---|
| 5,532,757 A * | 7/1996 | Miyazaki et al. | ........... | 348/646 |
| 5,638,139 A * | 6/1997 | Clatanoff et al. | ........... | 348/701 |
| 5,936,676 A * | 8/1999 | Ledinh et al. | .............. | 348/452 |
| 6,037,986 A * | 3/2000 | Zhang et al. | .......... | 375/240.12 |
| 6,181,382 B1 * | 1/2001 | Kieu et al. | .................. | 348/459 |
| 6,262,773 B1 * | 7/2001 | Westerman | .................. | 348/448 |
| 6,414,719 B1 * | 7/2002 | Parikh | ......................... | 348/448 |
| 6,421,090 B1 * | 7/2002 | Jiang et al. | ................. | 348/452 |
| 6,459,455 B1 * | 10/2002 | Jiang et al. | ................. | 348/452 |
| 6,577,345 B1 * | 6/2003 | Lim et al. | ................... | 348/452 |
| 6,606,126 B1 * | 8/2003 | Lim et al. | ................... | 348/452 |
| 6,661,464 B1 * | 12/2003 | Kokkosoulis et al. | ....... | 348/448 |
| 6,693,676 B2 * | 2/2004 | Yamaguchi et al. | ........ | 348/452 |
| 6,731,342 B2 * | 5/2004 | Shin et al. | ................... | 348/452 |
| 6,909,752 B2 * | 6/2005 | Zhou | ..................... | 375/240.21 |
| 6,985,187 B2 * | 1/2006 | Han et al. | .................... | 348/452 |
| 7,012,649 B2 * | 3/2006 | Michel | ....................... | 348/448 |
| 7,023,487 B1 * | 4/2006 | Adams | ........................ | 348/448 |
| 7,039,254 B1 * | 5/2006 | Maenaka et al. | ........... | 382/300 |
| 7,075,580 B2 * | 7/2006 | Jiang | ........................... | 348/448 |
| 7,095,445 B2 * | 8/2006 | Kim et al. | .................. | 348/448 |
| 7,142,247 B2 * | 11/2006 | Jung | ............................ | 348/452 |
| 2002/0130969 A1 * | 9/2002 | Han et al. | .................... | 348/452 |
| 2003/0095205 A1 * | 5/2003 | Orlick et al. | ................ | 348/448 |
| 2005/0099538 A1 * | 5/2005 | Wredenhagen et al. | ..... | 348/452 |
| 2006/0238650 A1 * | 10/2006 | Wredenhagen et al. | ..... | 348/452 |

\* cited by examiner

*Primary Examiner*—Brian P. Yenke
(74) *Attorney, Agent, or Firm*—Christopher P. Maioran P.C.

(57) ABSTRACT

A method for deinterlacing a picture is disclosed. The method generally includes the steps of (A) determining a protection condition by performing a static check on the picture in a region around a location interlaced with a first field of the picture, (B) calculating an interpolated sample at the location by temporal averaging the first field with a second field in response to the protection condition indicating significant vertical activity and (C) calculating the interpolated sample at the location by spatial filtering the first field in response to the protection condition indicating insignificant vertical activity.

18 Claims, 16 Drawing Sheets

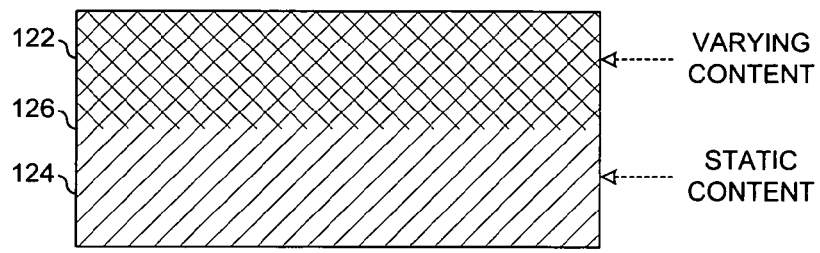
FIG. 4
FIG. 6
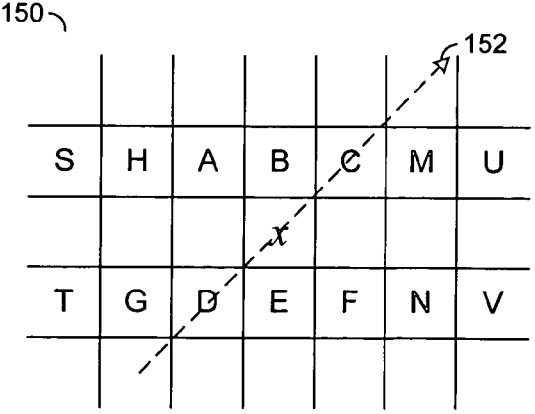
FIG. 7

| 160 | | | | | | | | | | | | | |
|---|---|---|---|---|---|---|---|---|---|---|---|---|---|
| ORIGINAL → | O | I | P | S | H | A | B | C | M | U | X | K | W |
| UNKNOWN → | | | | | | | x | | | | | | |
| ORIGINAL → | R | J | Q | T | G | D | E | F | N | V | Y | L | Z |

FIG. 8

| 194 | -6 | -5 | -4 | -3 | -2 | -1 | j | +1 | +2 | +3 | +4 | +5 | +6 |
|---|---|---|---|---|---|---|---|---|---|---|---|---|---|
| i | O | I | P | S | H | A | B | C | M | U | X | K | W |
|  |  |  |  |  |  |  | $x$ | $y$ |  |  |  |  |  |
| i+1 | R | J | Q | T | G | D | E | F | N | V | Y | L | Z |

FIG. 18

METHOD AND APPARATUS FOR VIDEO DEINTERLACING AND FORMAT CONVERSION

The present invention is related to co-pending U.S. patent applications Ser. No. 10/727,476, filed Dec. 4, 2003 and Ser. No. 10/744,693, filed concurrently, which are hereby incorporated by reference in their entirety.

FIELD OF THE INVENTION

The present invention relates to digital video formatting generally and, more particularly, to a method and an apparatus for video deinterlacing and format conversion.

BACKGROUND OF THE INVENTION

Digital images and video come in a large variety of formats. For many applications, converting between two or more different formats is desirable. A high-quality low-cost method for converting the digital signals is very useful for such applications as: (1) converting interlaced NTSC video at 60 fields/second to progressive video with a similar or larger horizontal and vertical resolution at 60 frames/second for display on progressive televisions, (2) performing a high-quality "zoom" function on either interlaced or progressive video and (3) increasing the horizontal and/or vertical resolution of progressive or interlaced video or images.

Existing solutions for video deinterlacing include bob (i.e., vertical spatial filter), weave (i.e., temporal filter), VT-filter (i.e., vertical spatial filter combined with temporal filter, commonly fixed filtering that combines a highpass version of a previous opposite parity field with a lowpass interpolation of a missing line from a current field), motion-adaptive and motion-compensated techniques and edge-based spatial filtering. The various video techniques that are not temporal in nature are applicable to image up-conversion (i.e., vertical and edge-based spatial filtering). Horizontal and edge-based spatial filtering is used for horizontal upsampling of images or video.

Bob (i.e., vertical filtering) is known to produce temporal flickering artifacts in video and reduced vertical detail in both images and video. In vertical filtering, odd and even lines are alternately blurred in the video by interpolation in a vertical direction only from adjacent lines. A resulting lack of vertical detail is particularly noticeable for sharp edges. Weave (i.e., temporal filter) is known to produce "jaggies" (i.e., interlace artifacts that are extremely objectionable for moving objects). The VT-filtering is a fixed (i.e., non-adaptive) low-cost line-based process that is cost effective to implement in silicon but is known to produce temporal artifacts (i.e., trailing edges or "edge ghosts" from previous fields appear behind moving objects).

Motion adaptive techniques commonly make pixel-level, block-level and/or picture-level decisions about whether to use weave or bob or a blended combination of weave and bob for particular pixels, blocks and/or pictures. Weave is a good option for still portions of video and a poor choice for moving areas. Hard block-level decisions in motion adaptive techniques can lead to objectionable blocking artifacts. However, more advanced motion adaptive deinterlacing techniques that combine weave and bob suffer mainly from relatively poor performance for moving video due to all the drawbacks of bob. For stationary regions, however, the flickering artifact created by bob may be reduced.

Motion compensated techniques operate in a similar manner to motion adaptive techniques, except that rather than always using co-located pixels from a previous opposite parity field to replace missing pixels in a progressive frame that is formed from the current field (i.e., weave), motion compensated pixels are chosen from the previous opposite parity field. An advantage of the motion compensated technique is that good deinterlacing is achievable for moving video that can be well estimated. A disadvantage of the motion compensated technique is that motion estimation is often more expensive than any of the previously mentioned techniques. If motion estimation fails on the video sequence (i.e., highly irregular motion, non-smooth motion fields or various lighting effects), motion compensated techniques may be no better than less complex methods. Furthermore, even when motion estimation is successful, an amount of high-frequency information that can be transferred from the previous opposite parity field to the estimate of the missing lines for reconstruction a progressive frame from the current field depends upon a sub-pel motion between the two fields. In a worst case, objects can move by an integer number of pels plus exactly one-half pel in the vertical direction in the temporal interval between the previous field and current field. Therefore, no additional high-frequency vertical information for the missing lines of the current field is gleaned from the previous field through the motion compensated estimate. In practice, however, motion compensated deinterlacing increases vertical detail while reducing flickering artifacts on a broad range of video, such that a common drawback is simply complexity.

Edge-based spatial filtering operates on only the current field and is capable of producing a better estimate of the pixels from the missing lines than what is possible with vertical filtering only. To a lesser extent than bob, edge-based spatial filtering also suffers from lack of vertical detail. In particular, high frequency textures that lack edges will not be improved over simple bob.

SUMMARY OF THE INVENTION

The present invention concerns a method for deinterlacing a picture. The method generally comprises the steps of (A) determining a protection condition by performing a static check on the picture in a region around a location interlaced with a first field of the picture, (B) calculating an interpolated sample at the location by temporal averaging the first field with a second field in response to the protection condition indicating significant vertical activity and (C) calculating the interpolated sample at the location by spatial filtering the first field in response to the protection condition indicating insignificant vertical activity.

The objects, features and advantages of the present invention include providing a method and an apparatus for video deinterlacing and format conversion that may (i) eliminate an exhaustive evaluation of all candidate directions by exploiting a convex nature of a metric search space, (ii) reuse identical silicon for both intra-mode estimation and edge detection for deinterlacing, (iii) use a different number of filter taps for vertical interpolation compared to directional interpolation, (iv) exploit homogeneity along edges that may be strong and regular enough to be detected without admitting artifacts from false detects, (v) prevent artifacts in areas containing small apertures, (vi) detect static horizontal edges, (vii) detect static areas of small spatial extent, (viii) reduce a severity of artifacts from false angle detections, (ix) increase a confidence level of decisions, (x) provide a robust and correct confidence estimation for an angle detection, (xi)

refine a decision between angles adjacent to a best angle detected by a first rough and cheap estimator, (xii) operate at a lower clock speed, (xiii) reduce microprocessor utilization, (xiv) reduce silicon area by re-using silicon designed for video compression for an additional task of deinterlacing, (xv) reduce interpolation complexity for non-vertical directional interpolation without sacrificing quality, (xvi) permit a detection of edges to be more aggressive in areas without small apertures thereby increasing visual performance on edges without increasing artifacts from false detections, (xvii) reduce annoying flickering artifacts, (xviii) increase quality of low-contrast and marginally detectable edges, (xix) increase correction detection probability, (xx) reduce false detection probability and/or (xxi) increase quality through decreasing a probability of detecting an angle adjacent to an optimal angle.

BRIEF DESCRIPTION OF THE DRAWINGS

These and other objects, features and advantages of the present invention will be apparent from the following detailed description and the appended claims and drawings in which:

FIG. 4 is a diagram of an example picture having a stationary horizontal edge;

FIG. 6 is a diagram of example horizontal stationary edge conditions;

FIG. 7 is a diagram of an example field being deinterlaced;

FIG. 8 is a diagram of an example edge detection window;

FIG. 18 is a diagram of an example small aperture detection window; and

DETAILED DESCRIPTION OF THE PREFERRED EMBODIMENTS

The present invention may be realized as a low-cost high quality deinterlacing technique. The technique may provide spatial filtering by considering directional information at a pixel level in a field. Low cost may be realized through the following methods that may be optionally applied to reduce implementation complexity. The implementation complexity may depend on an application platform (e.g., fully custom hardware, hardware processor extension or full software implementation).

Figure 1:
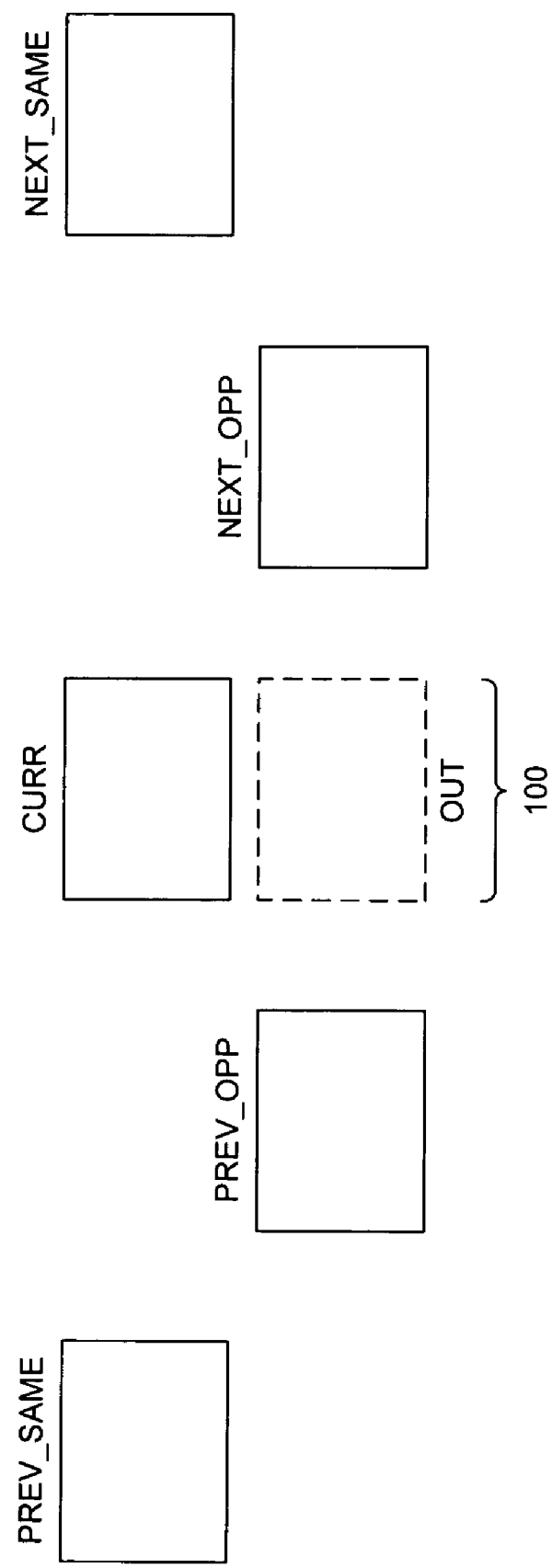
FIG. 1 is a block diagram of an example field availability.

Referring to FIG. 1, a block diagram of an example field availability is shown. A frame 100 in a picture may be generated by calculating an interpolated field (e.g., OUT) interlaced with a current field (e.g., CURR) of the picture. Generation of the interpolated field OUT may be performed using one or more of (i) a first previous field (e.g., PREV_OPP) having an opposite parity (e.g., top or bottom, odd or even) as the current field CURR, (ii) a second previous field (e.g., PREV_SAME) having a same parity as the current field CURR, (iii) a first next field (e.g., NEXT_OPP) having the opposite parity as the current field CURR and (iv) a second next field (e.g., NEXT_SAME) having the same parity as the current field CURR. Both previous field PREV_SAME and PREV_OPP may occur earlier in a display order and/or time than the current field CURR. Both next fields NEXT_SAME and NEXT_OPP may occur later in the display order and/or time than the current field CURR. In general, each of the fields PREV_SAME, PREV_OPP, NEXT_SAME and/or NEXT_OPP may be any field in the vicinity of the current field CURR including, but not limited to, adjoining and/or immediately adjacent fields. For simplicity, only the previous fields PREV_SAME and PREV_OPP may be illustrated in some of the examples below to illustrate the present invention, although any one or more of the fields may be used.

Figure 2:
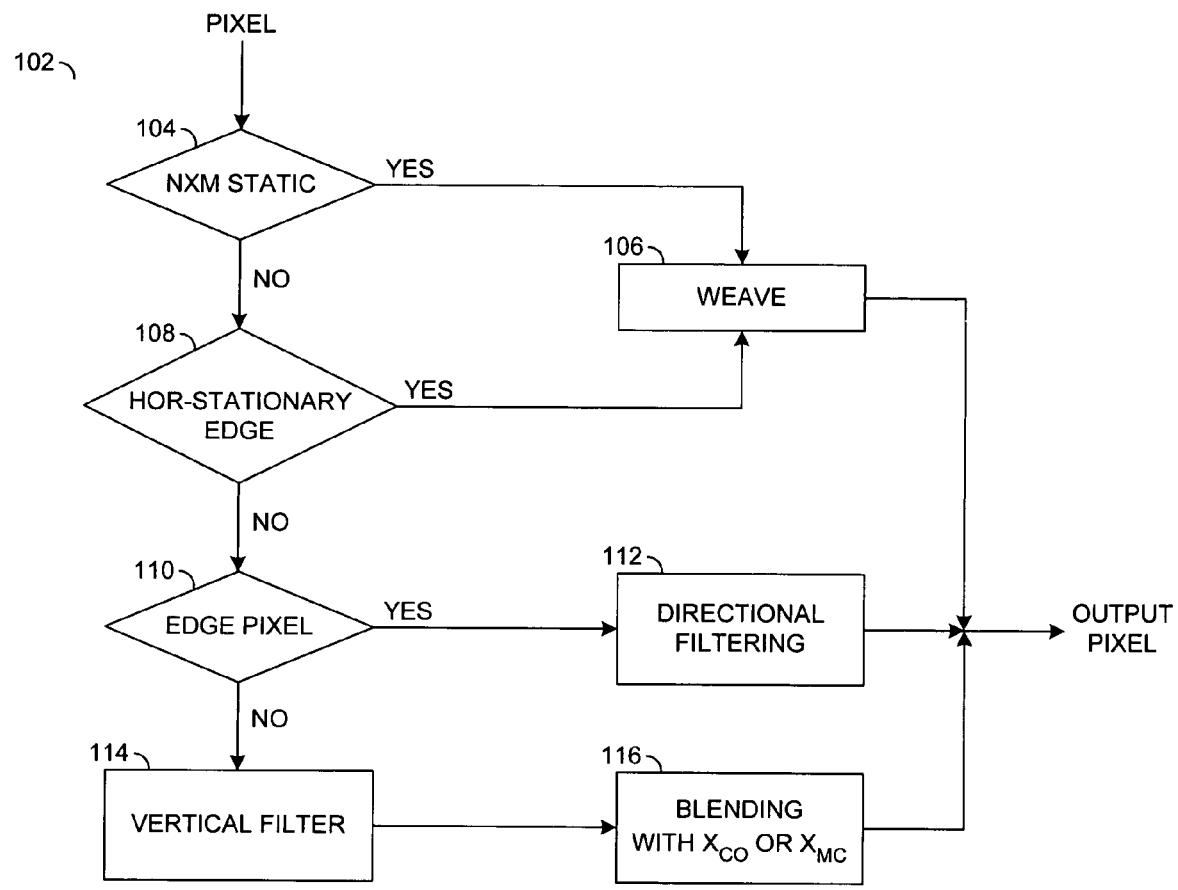
FIG. 2 is a flow diagram for an example implementation of a deinterlacing method in accordance with a preferred embodiment of the present invention.

Referring to FIG. 2, a flow diagram for an example implementation of a deinterlacing method 102 is shown in accordance with a preferred embodiment of the present invention. The deinterlacing method 102 generally comprises a step (or block) 104, a step (or block) 106, a step (or block) 108, a step (or block) 110, a step (or block) 112, a step (or block) 114 and a step (or block) 116. A signal (e.g., PIXEL) may be received at the step 104. A signal (e.g., OUTPUT_PIXEL) may be generated by the blocks 106, 112 and 116.

The step 104 may be operational to perform a static check in a region around a location of the interpolated field OUT where an interpolated sample is to be created. The region may cover N (e.g., 3) horizontal by M (e.g., 3) vertical pixels or samples (e.g., a luminance component of a pixel). Other region sizes may be implemented to meet the criteria of a particular application. If the step 104 concludes that the interpolated sample may be in a static area of the picture (e.g., the YES branch of step 104), the method 102 may proceed to the step 106. If the step 104 concludes that the interpolated sample may be in an area of the picture with motion (e.g., the NO branch of step 104), an additional check may be performed by the step 108.

The step 106 may be operational to perform temporal filtering (e.g., weave) to generate the interpolated sample from the current field CURR and one or more of the previous fields PREV_OPP and/or PREV_SAME. In one embodiment, the temporal filtering may combine the current field CURR and only the opposite parity previous field PREV_OPP. Other temporal filtering methods may be implemented to meet the criteria of a particular application.

The step 108 may be operational to detect a presence of a horizontal stationary edge in the picture (e.g., current field CURR). If the location of the interpolated sample is on a static side of a horizontal stationary edge (e.g., the YES branch of step 108), the temporal filtering of the step 106 may be used to calculate the interpolated sample. If the location of the interpolated sample is not on a static side of a horizontal stationary edge or no horizontal stationary edge exists in the picture proximate the location (e.g., the NO branch of step 108), another check is made by the step 110 for other edges in the picture.

The step 110 may be operational to detect non-horizontal edges in the picture (e.g., the current field CURR). If a good usable edge is detected at or near the location of the interpolated sample (e.g., the YES branch of step 110), the method 102 may mark and edge as found and perform a directional filtering per the step 112. If no edges are detected or all of the edges detected are unusably weak and thus marked as not found (e.g., the NO branch of step 110), vertical filtering may be used to generate the interpolated sample.

The step 112 may be operational to calculate the interpolated sample by spatial filtering along an angle corresponding to the edge detected by the step 110. The step 114 may be operational to calculate the interpolated sample by vertical (spatial) filtering. The step 116 may be operational to modify the interpolated sample generated by the step 114 by blending with a co-located sample Xco or a motion compensated sample Xmc. The samples Xco and Xmc may be calculated either from (i) the previous field PREV_OPP and the next field (NEXT_OPP) having the same parity as the previous field PREV_OPP or (ii) the previous field PREV_SAME and the next field (NEXT_SAME) having the same parity as the previous field PREV_SAME.

Figure 3:
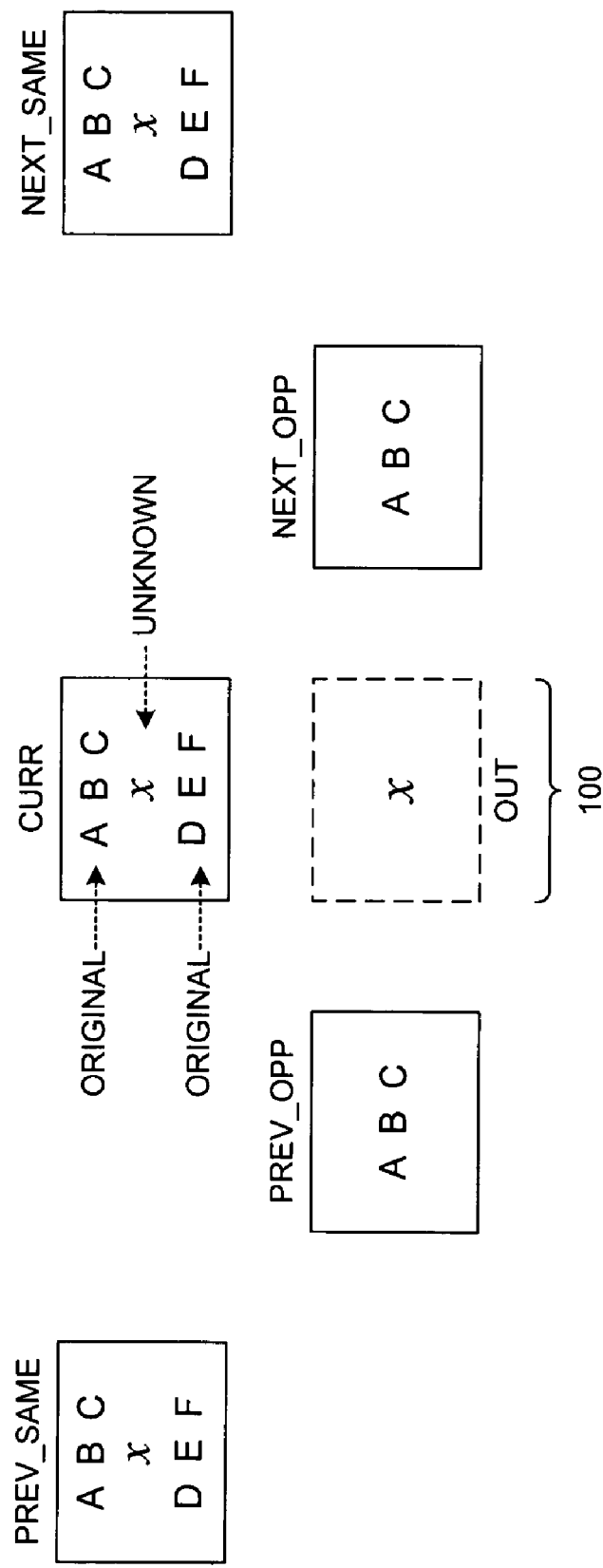
FIG. 3 is a diagram of example fields used in a static check with an example of a neighborhood used in the static check.

Referring to FIG. 3, a diagram of example fields used in a static check is shown. The location of the interpolated sample may be illustrated by a letter X. Locations of known samples may be illustrated by the letters A, B, C, D, E and F. The reference letters A, B, C, D, E, F and X may also be used to represent sample value or pixel values in mathematical equations and boolean operations discussed below.

For the current field CURR and the previous field PREV_SAME, the locations B and E may be positioned directly above and below the location X, respectively. The locations A and C may be immediately to the left and right of the location B, respectively. The locations D and F may be immediately to the left and right of the location E, respectively. For the previous field PREV_OPP, the location X may be the same as the location B.

The static check step 104 may include (i) any conditions that specify an approximate equality of a set of neighboring sample values or pixels in the current field CURR and the previous field PREV_SAME and (ii) any "protection" conditions in areas of significant vertical activity. For the static check step 104 to be evaluated as true (e.g., the YES branch), both the equality condition and the protection condition should evaluate as true. A specific equality condition may aggregate multiple pixel-by-pixel comparisons over the set of neighboring pixels. A preferred technique may be to compare the sample values at the locations A, B, C, D, E and F between the current field CURR and the previous field PREV_SAME. If PREV_SAME (A,B,C,D,E,F) are approximately equal to CURR (A,B,C,D,E,F), then the interpolated sample at the location X may be calculated as the known sample at location B in the previous field PREV_OPP. Generally, samples "a" and "b" may be considered approximately equal (e.g., a≈b) if either or both of equations 1 or 2 are true as follows:

$$|a-b|<p1 \qquad \text{Eq. (1)}$$

$$p2*|a-b|<\min(a,b) \qquad \text{Eq. (2)}$$

where p1 and p2 are programmable parameters with suggested values of 6 and 15, respectively.

In general, the static check may be performed to avoid the interpolated pixel changing local vertical activity dramatically. Therefore, the protection condition may be performed as part of the static check. The protection condition may specify that the vertical activity after the inclusion of the inserted pixel or pixels is not much greater than the vertical activity of the neighborhood of pixels in the original field. An example protection condition may be defined per equation 3 as follows:

$$|B-X|+|X-E|<p3*|A-D|+p4*|B-E|+p3*|C-F| \qquad \text{Eq. (3)}$$

where p3 and p4 are programmable parameters with default values of 1 and 2, respectively, X is the interpolated sample and A, B, C, D, E and F may be known samples from the current field CURR. Other protection conditions may be implemented to meet the criteria of a particular application. The protection mechanism may impact interpolation performance in areas of high vertical frequency but generally prevents possible artifacts in areas of high temporal frequency.

Referring to FIG. 4, a diagram of an example picture 120 having a stationary horizontal edge is shown. The picture 120 may comprise a first region 122 and a second region 124. A horizontal edge or boundary 126 in the picture may separate the region 122 from the region 124. The region 122 may present spatially varying content of the picture. The region 124 may present spatially static content of the picture. The region 122 may be above the region 124 (as shown) or the region 124 may be above the region 122 (not shown). The horizontal stationary edge situation may frequently occur in sports sequences and news sequences. If not accounted for, interpolated pixels along the horizontal static edge 126 may result in a noticeable line flickering.

Figure 5:
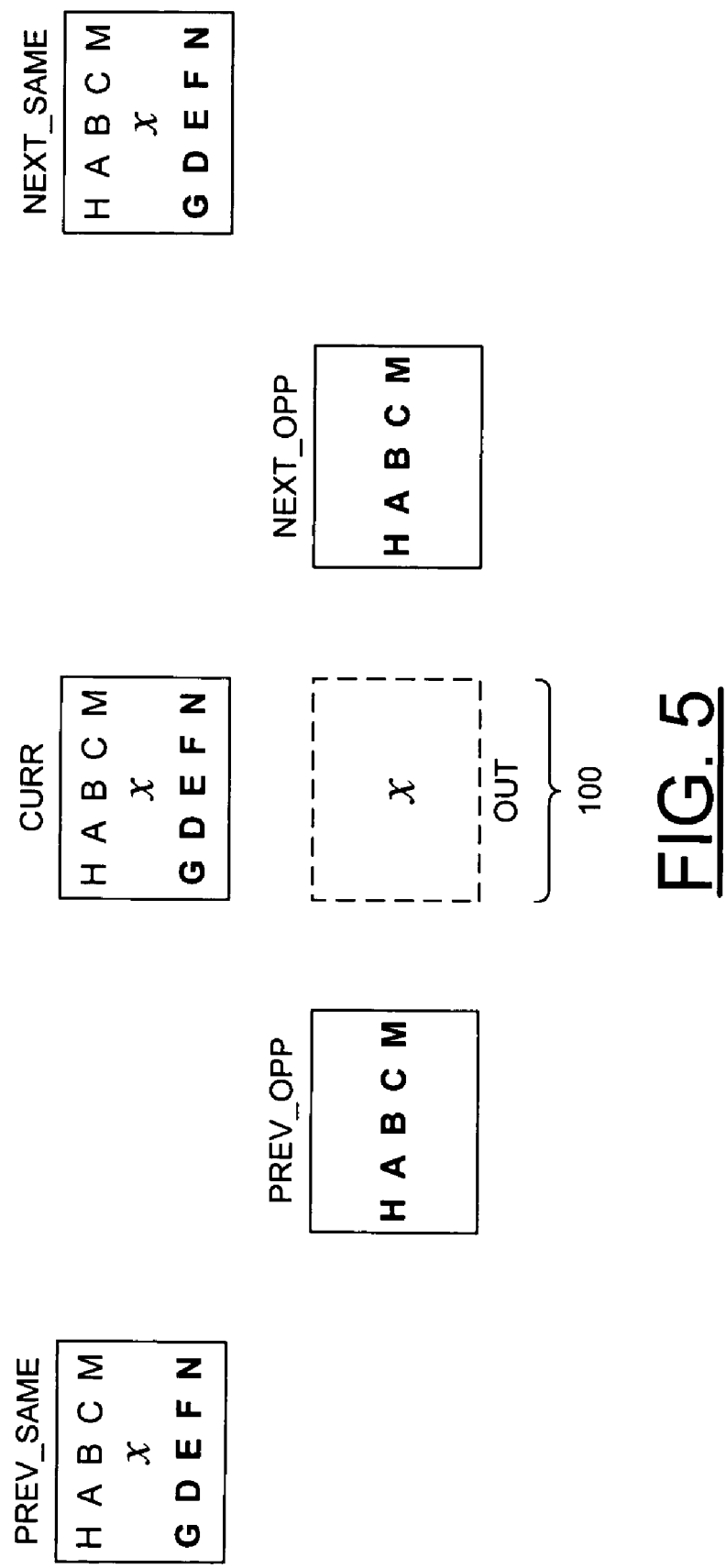
FIG. 5 is a diagram of example fields used in a horizontal stationary edge check.

Referring to FIG. 5, a diagram of example fields used in the horizontal stationary edge check are shown. The horizontal stationary edge check may check one or more conditions to determine if a horizontal stationary edge is present. A first condition may specify the horizontal neighborhood pixels (e.g., G–N) to have sufficiently low variation. A second condition may specify a vertical variation to be much larger than a variation among the pixels G–N. Additional conditions may be included in the check to meet the criteria of a particular application. For example, if the interpolated sample is located on the stationary content side of the edge 126, the horizontal stationary edge check (step 108) and subsequent weave (step 106) may be determined by equation 4 as follows:

If (1) $\max(G,D,E,F,N)<p5*\min(G,D,E,F,N)$ is true for both CURR and PREV_SAME, where p5 is a programmable parameter with a suggested value of 1.2, && (2) $\min(|H-G|,|A-D|,|B-E|,|C-F|,|M-N|)>p6*(p7+\max\text{diff}(G,D,E,F,N))$ is true for both CURR and PREV_SAME, where maxdiff( ... )= max( ... )−min( ... ) and where p6 and p7 are programmable parameters with suggested values of 5 and 2 respectively, && (3) $PREV\_SAME(G,D,E,F,N) \approx CURR(G,D,E,F,N)$ && (4) $CURR(E) \approx PREV\_OPP(B)$ (e.g., protection)

then $X=PREV\_OPP(B)$ \qquad Eq. (4)

Condition (1) may be true where a range of the stationary side of the edge 126 is small. Condition (2) may be true if a minimum gradient across the edge 126 is greater than the range of the stationary side of the edge. Condition (3) may be true if one side of the edge 126 is stationary (e.g., a lower edge G, D, E, F, N as shown). Condition (4) may be true if X is on the stationary side of the edge. If any of the conditions (1) through (4) are false, the horizontal stationary edge check may fail and the step 110 may check if the location of the interpolated sample is proximate an edge of the picture.

Referring to FIG. 6, a diagram of example horizontal stationary edge conditions are shown. Fields 130, 132 and 134 generally illustrate situations where a lower horizontal edge (e.g., G, D, E, F, N) may be stationary. Fields 136, 138 and 140 generally illustrate situations where an upper horizontal edge (e.g., H, A, B, C, M) may be stationary. The field 130, 134, 136 and 140 generally illustrate situations where the interpolated sample is located near a corner of the picture. Flickering may also be reduced through (i) applying a deflickering filter to the deinterlaced frames and/or (ii) performing a pixel-based static check using two fields of the same parity and/or horizontal static edge check using two fields of the same parity and/or a static check using two fields (e.g., using an absence of weave artifacts as an indicator of static regions).

Referring to FIG. 7, a diagram of an example field 150 being deinterlaced is shown. If the interpolated sample X is located near or on an edge 152, spatial interpolation along an orientation of the edge 152 may be used instead of vertical filtering.

Referring to FIG. 8, a diagram of the example edge detection window 160 is shown. The edge detection window 160 may span an number (e.g., 2 to 32) of pixels/samples horizontally and a number (e.g., 2 to 8) of field lines vertically. The location X may be disposed at approximately a center of the edge detection window 160.

Figure 9:
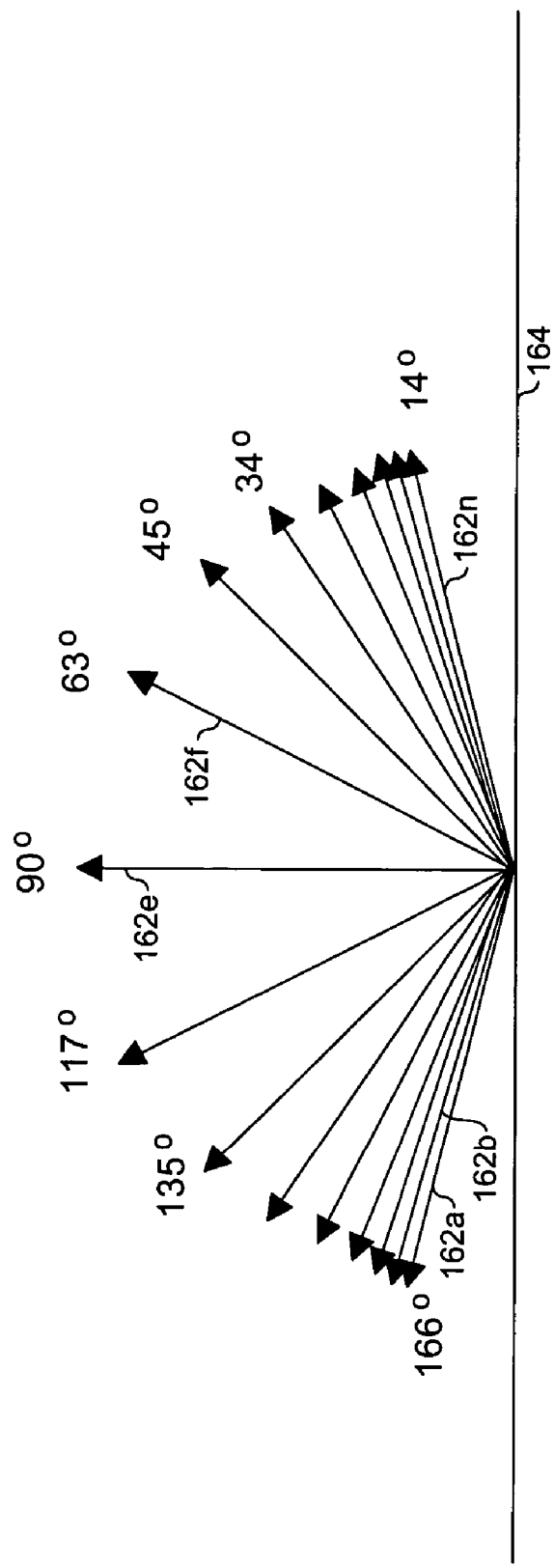
FIG. 9 is a diagram of example search angles relative to a horizontal axis.

Referring to FIG. 9, a diagram of example search angles 162a-162n relative to a horizontal axis 164 are shown. The search angles 162a-162n may be disposed in the edge detection window 160 centered on the interpolated sample location X. In one embodiment, the search angles 162a-162n may be angularly offset relative to the horizontal axis 164 by equations 5a or 5b as follows:

$$\text{Angle} = \tan^{-1}(2/a), \text{ where } a=0, 1, \ldots n \quad \text{Eq. (5a)}$$

$$\text{Angle} = 180° - \tan^{-1}(2/a), \text{ where } a=1, \ldots n \quad \text{Eq. (5b)}$$

As such, an angular separation between neighboring search angles 162a-162n may vary as a function of the angles. For example, the angular separation between the search angles 162e (e.g., 90 degrees) and the search angle 162f (e.g., 63 degrees) may be 27 degrees. However, an angular separation between the search angles 162a (e.g., 166 degrees) and the search angle 162b (e.g., 164 degrees) may be only 2 degrees. In another embodiment, the search angles 162a-162n may be angularly separated by a constant amount (e.g., 15 degrees).

The hierarchical angle search method for detection of angles for edge-based spatial filtering may be applied to a serial hardware implementation (e.g., a single hardware unit, potentially implemented as a custom hardware extension to a microprocessor) may be designed in a programmable way such that the method may calculate a matched filter "goodness of fit" metric for a large number of possible edge directions (e.g., 15, 30, 45, 60, 75, 90, 105, 120, 135, 150 and 165 degree angles). A brute force implementation would utilize a single invocation of a unit implementing the method for each of the angles (e.g., 11) under consideration. However, equal performance may be achieved by first evaluating some primary angles (e.g. 15, 45, 75, 105, 135 and 150 degree angles), then computing the scores for the two immediately neighboring angles of the best angle from the primary angles (e.g., only 8 evaluations instead of 11). The winning angle may be the overall best score among the evaluated angles. By using multiple levels of hierarchy, a total number of angles evaluated for each interpolation location may be significantly reduced.

Figure 10:
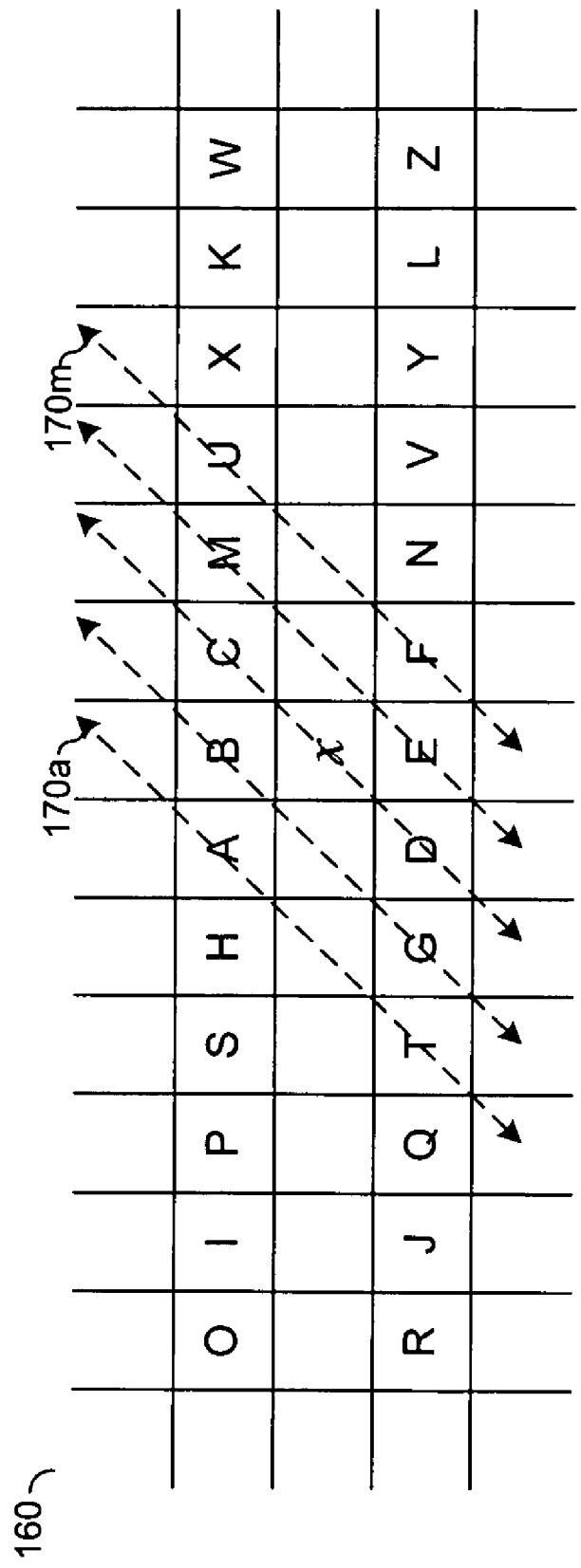
FIG. 10 is a diagram for an example edge search at a 45 degree angle.
Figure 11:
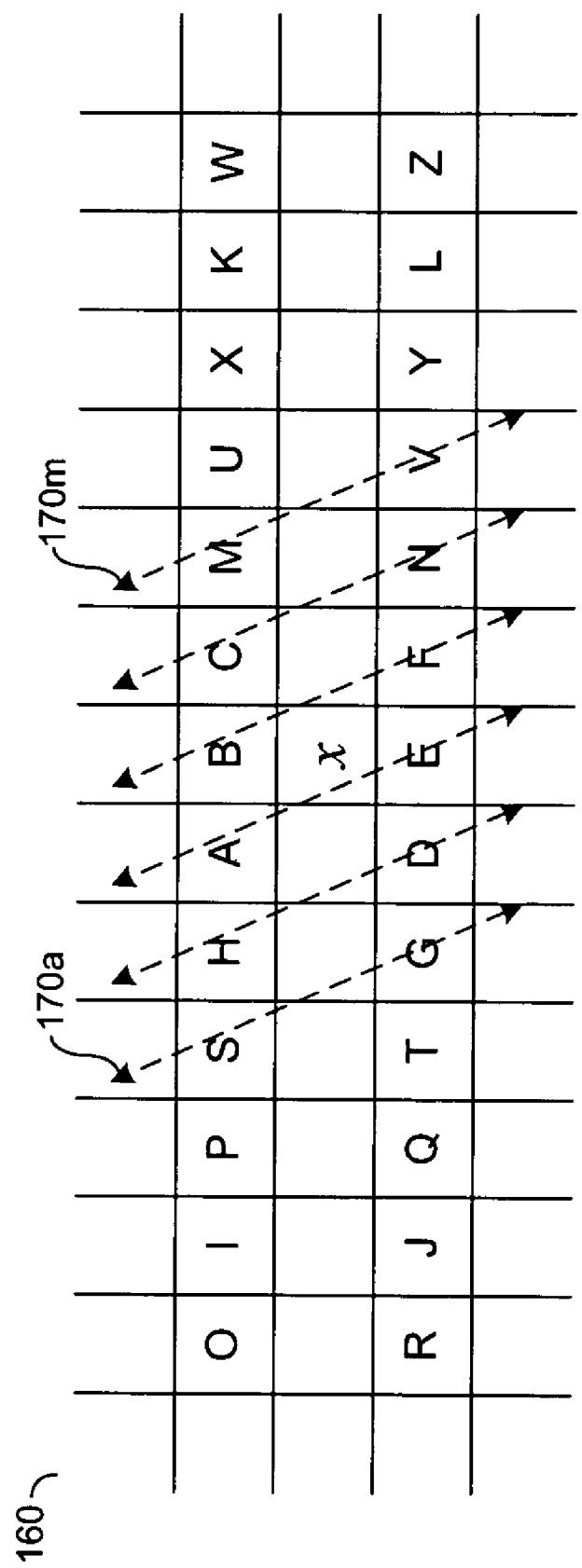
FIG. 11 is a diagram for an example edge search at a 117 degree angle.

Referring to FIGS. 10 and 11, diagrams for example edge searches at a 45 degree angle and a 117 degree angle are shown. The edge search may be performed along a number of line segments 170a-170m. Each of the line segments 170a-170m may be oriented parallel to each other and parallel to the particular search angle 162a-162n under consideration. The line segments 170a-170m may collectively be referred to as a set.

Two diagnostic parameters (e.g., d and t) may be generated for the set at each individual search angle 162a-162n. The diagnostic parameter "d" may be referred to as a "first score". The diagnostic parameter "t" may be referred to as a "second score". The diagnostic parameters for the 45 degree search angle may be calculated by equations 6 and 7 as follows:

$$d(45) = |A-T| + |B-G| + 2*|C-D| + |M-E| + |U-F| + PEN(45) \quad \text{Eq. (6)}$$

$$t(45) = (|(A-B)-(T-G)| + 2*|(B-C)-(G-D)| + 2*|(C-M)-(D-E)| + |(M-U)-(E-F)|)*5 \quad \text{Eq. (7)}$$

The diagnostic parameters for the 117 degree search angle may be calculated by equations 8 and 9 as follows:

$$d(117) = |S-G| + |H-D| + |A-E| + |B-F| + |C-N| + |M-V| + PEN(117) \quad \text{Eq. (8)}$$

$$t(117) = (|(S-H)-(G-D)| + 2*|(H-A)-(D-E)| + 4*|(A-B)-(E-F)| + 2*|(B-C)-(F-N)| + |(C-M)-(N-V)|)*3 \quad \text{Eq. (9)}$$

Shallower edges may be penalized relative to steeper angles by a directional edge detection unit (not shown) performing the edge detection operation in the step 110. A penalty value (e.g., PEN) may be added to the first score d. The penalty value PEN may be a function of the search angle 162a-162n. An advantage of the penalty may be that false detections of steeper angles 162a-162n generally result in less severe artifacts than false detections of shallower angles 162a-162n. Penalizing the shallower angles 162a-162n may be useful when trying to recognize even quite weak, low-contrast or marginally detectable edges. Another technique to ignore low-contrast angles is through the mechanism of reducing pixel/sample bit-depth in the edge detection window 160. An example of the penalty value PEN as a function of a search angle (e.g., ANG) is generally provided in TABLE I as follows:

TABLE I

| | ANG | | | | | | | | |
|---|---|---|---|---|---|---|---|---|---|
| | 90 | 63, 117 | 45, 135 | 34, 146 | 27, 153 | 22, 158 | 18, 162 | 16, 164 | 14, 166 |
| PEN | 0 | 24 | 42 | 60 | 78 | 96 | 114 | 132 | 160 |

A directional averaging operation may be performed by the step 110 as part of the edge orientation decision. Using a number of variables (e.g., α and β) defined by equations 10 and 11, an edge detection decision may be given by equation 12 as follows:

$$\alpha = arg\ min(d(i)),\ i \in \{14°, 16°, L, 166°\} \qquad \text{Eq. (10)}$$

$$\beta = arg\ min(d(i)),\ i \in \{14°, 16°, L, 166°\}\ \text{and}\ i \neq \alpha \qquad \text{Eq. (11)}$$

If $d(\alpha)$<Threshold_d (e.g., 192)  Eq. (12)

&& $\alpha$ and $\beta$ are immediate neighbors or $d(\alpha)*p8<d(\beta)$, where p8 is a programmable parameter with a suggested value of 2,
&& $t(\alpha)$<Threshold_t (e.g., 1200)
then X=(U+V)/2 where U and V may be the two samples along the direction $\alpha$L, and Threshold_d and Threshold_t may be predetermined values.

Once the step 110 has determined (i) that one or more suitable edges have been detected and (ii) a best angle among one or more angles corresponding to the one or more detected edges, the step 112 may generate the interpolated sample X by performing directional filtering based on the best angle. The best angle may be associated with a best score among the multiple scores generated for the various search angles 162a-162n.

Calculating a score for a particular search angle generally involves computing scores along each of the several parallel line segments 170a-170m within the set for the particular search angle. The line segment scores may then be averaged together either (i) with the same weights on each score or (ii) with different weights. Because of the averaging, the following situation may happen. A best score may be determined after calculating the average scores for each of the search angles. However, an actual best interpolation angle may be slightly different from the "best" angel (e.g., BA) corresponding to the best score. Therefore, additional comparisons may be performed within a small window around the angle BA. The additional comparisons may be performed among the angle BA and two immediate neighboring angles, one on each side of the angle BA. A true best angle may be used to interpolate the sample X.

A first example averaging operation using the 45 degree search angle may be performed per equation 13 as follows:

$$dm = min(|B-D|,|C-E|,|C-G|,|M-D|,|C-D|) \qquad \text{Eq. (13)}$$

if dm=|B−D|, then X=(B+D)/2
if dm=|C−E|, then X=(C+E)/2
if dm=|C−G|, then X=(C+G)/2
if dm=|M−D|, then X=(M+D)/2
if dm=|C−D|, then X=(C+D)/2

A second example averaging operation using the 117 degree search angle may be performed per equation 14 as follows:

If $|B-E|<min(|A-F|,|A-E|,|B-F|)$, then X=(B+E)/2  Eq. (14)

else if $|A-F|<min(|B-E|,|A-E|,|B-F|)$, then X=(A+F)/2
else X=(A+B+E+F)/4

For vertical filtering, less blurring may be achieved through a use of a large number of filter taps (e.g., a 4-tap filter is generally capable of retaining high vertical frequencies better than simple 2-tap linear interpolation). However, for edge-based spatial filtering, detectable directional edges may be nearly homogeneous. Successfully recognized edges with a high confidence may practically benefit from edge-based spatial filtering without a significant false detection rate to introduce artifacts. Therefore, a larger number of filter taps may provide no additional benefits. Instead, a simple bilinear interpolation in a direction of the edge is generally sufficient for attaining high quality while also being an efficient and low cost method to implement.

Some systems that incorporate edge-based spatial interpolation may also incorporate directional predictors for intra-estimation for video compression (e.g., 4×4 and 16×16 pel intra-prediction mode decision estimators of the H.264 standard). When intra-prediction mode information is available, the edge-based spatial interpolation may either (i) enhance the pixel-based directional edge decision with the block-based intra-prediction information available from an intra estimation unit or (ii) reduce silicon cost by replacing a custom pixel-based edge estimator with the block-based intra-prediction mode estimator.

Confidence numbers may be used within the directional filtering of the step 112. By way of example, consider k candidate angles (e.g., $\alpha 1$-$\alpha k$), with respective scores $d(\alpha 1)$ to $d(\alpha k)$ (e.g., the smaller a value of a score d(i), the more probable the corresponding angle $\alpha i$ will be used). A confidence number (e.g., CONF) may be used as a measure of the confidence level of the angle $\alpha i$. The confidence number CONF may then be compared to a threshold. If the best angle $\alpha i$ has a confidence number CONF greater than the threshold, the best angle $\alpha i$ may be used for the directional filtering. Otherwise, vertical filtering may be used to calculate the interpolated sample. The confidence number CONF may be determined by equation 15 as follows:

$$CONF(\alpha i) = \frac{\frac{1}{d(i)}}{\sum_{j=1}^{k} \frac{1}{d(i)}} \qquad \text{Eq. (15)}$$

Figure 12:
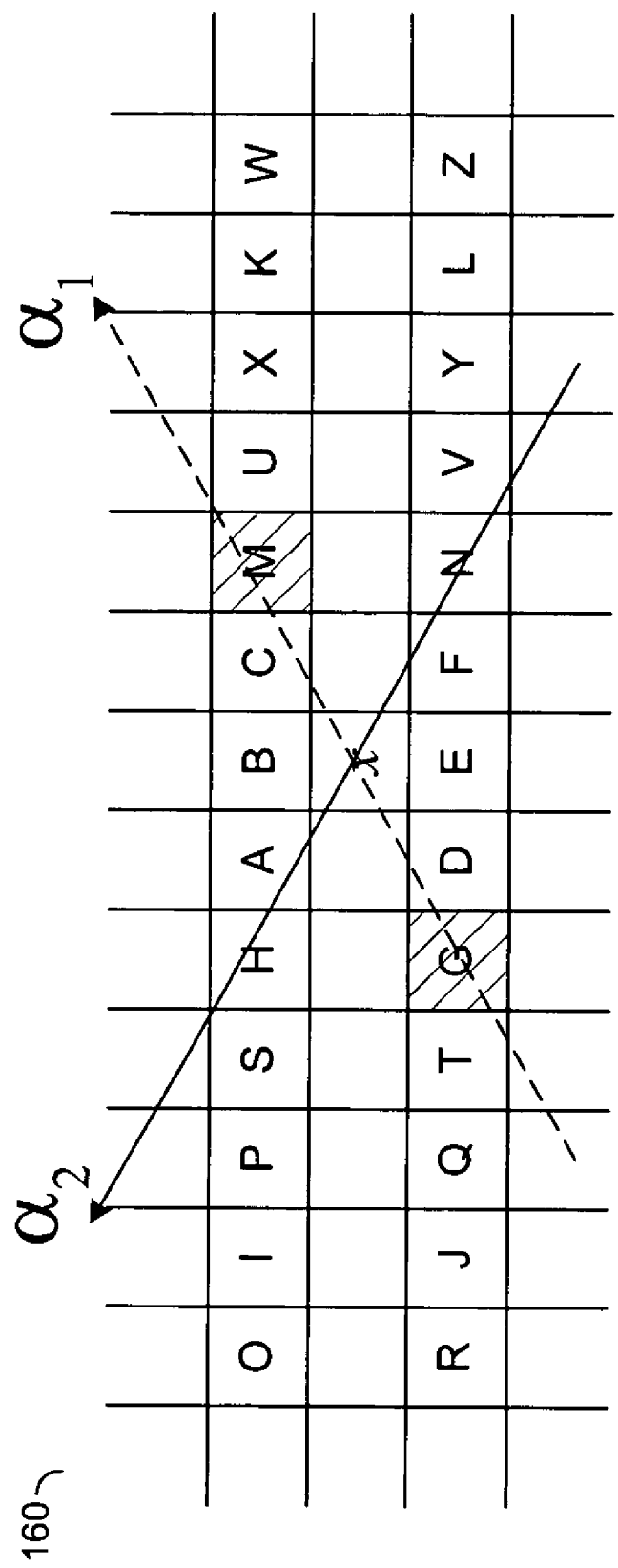
FIG. 12 is a diagram illustrating an example condition for a protection mechanism.

Referring to FIG. 12, a diagram illustrating an example condition for a protection mechanism is shown. Generally, a wrong direction (e.g., angle $\alpha 2$) may be better than a correct direction (e.g., angle $\alpha 1$), possibly due to noise or a nearby small aperture in the picture (e.g., at location G and/or M). Therefore, the step 110 may perform a protection check after a suitable edge has been detected in the picture. If the protection check determines that the correct angle $\alpha 1$ has a problem, then the method 102 may proceed with the vertical filtering step 114 instead of the directional filtering step 112.

Figure 13:
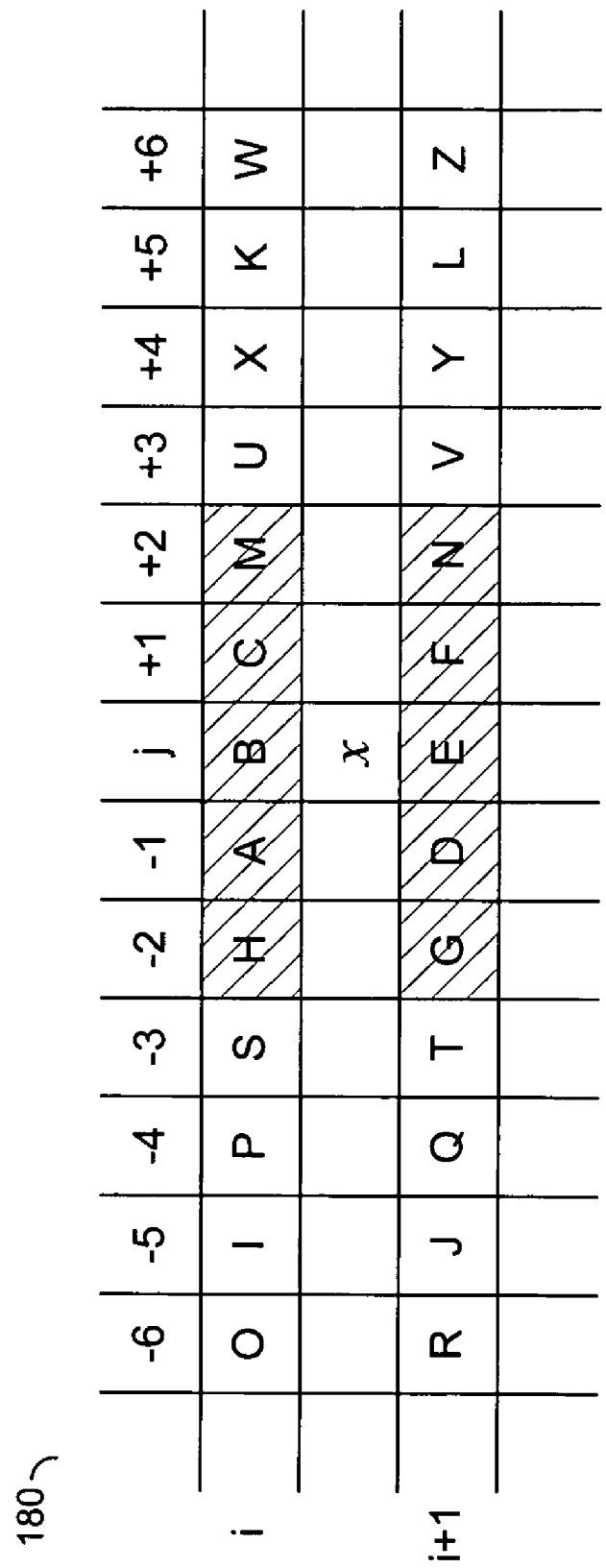
FIG. 13 is a diagram of an example small aperture detection window.

Referring to FIG. 13, a diagram of an example small aperture detection window 180 is shown. The small aperture detection window 180 generally comprises a number of columns (e.g., 3 to 13) horizontally and a number of lines (e.g., 2 to 8) vertically. The interpolated sample location X may be centered in the small aperture detection window 180 between a first line (e.g., i) and a second line (e.g., i+1) in a column (e.g., j). In the example shown, the small aperture detection window 180 may include locations H, A, B, C, M, G, D, E, F and N.

A method to detect small apertures and disable non-vertical edge-based spatial filtering in regions containing small apertures may be provided in the step 110. In a region with a small aperture, there is generally insufficient evidence for which direction (or angle) the correct edge oriented. Artifacts may result if a wrong direction (or angle) is determined for edge-based spatial (direction) filtering. Since shallower detected edges generally have a greater a potential for causing artifacts in the sample interpolations due to the false detection, vertical filtering or vertical filtering with temporal blending may be forced in the small aperture regions. An example group of steps for detecting a small aperture in a region near the location X may be as follows:

(1) minC=min(up[j−2], ..., up[j+2])=up[h].
(2) maxL=max(up[h−1], up[h−2], up[h−3], up[h−4]).
(3) maxR=max(up [h+1], up[h+2], up[h+3], up[h+4]).
(4) Repeat steps (1), (2), and (3) for lower line.
(5) If maxL>>minC<<maxR is true for both upper and lower lines, then location X is in a small aperture area.
(6) Repeat steps (1) to (5) with min and max exchanged and << and >> exchanged.

In the above steps, ">>" and "<<" stand for substantially greater and substantially smaller, respectively.

Figure 14A:
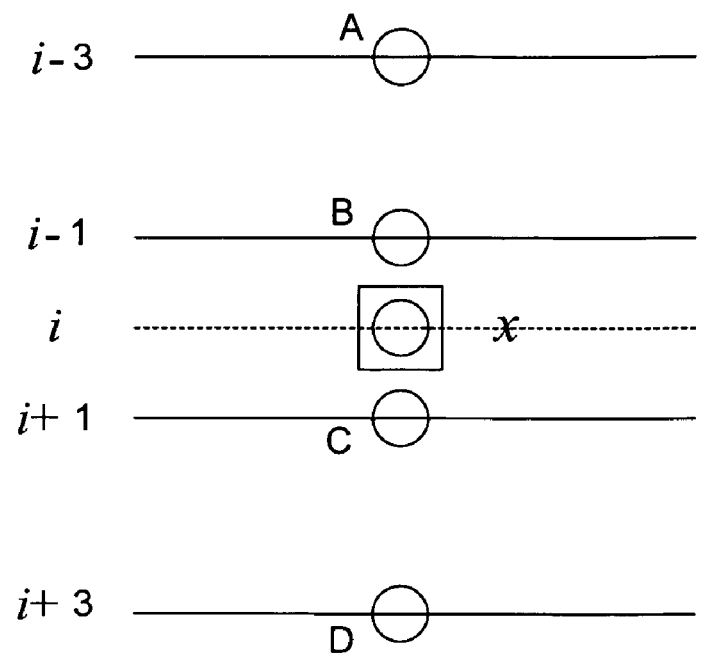
FIGS. 14a and 14b are diagrams illustrating an example blending method.
Figure 14B:
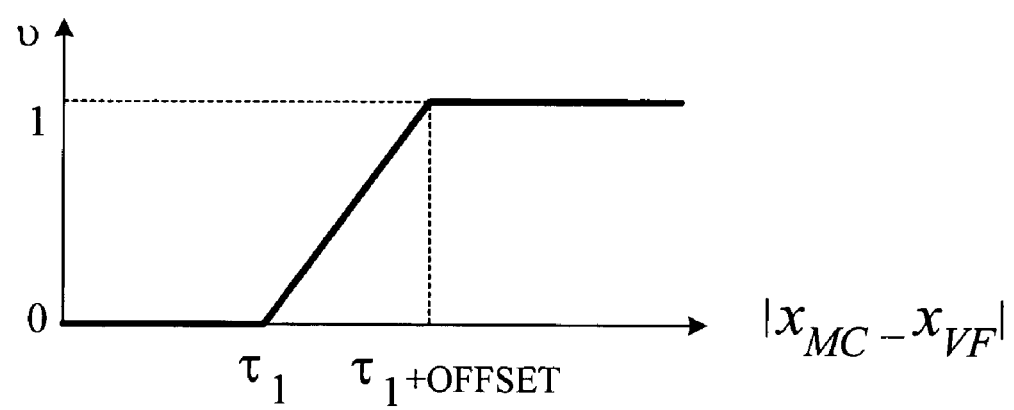

Referring to FIGS. 14a and 14b, diagrams for an example blending method are shown. FIG. 14a illustrates a group of known samples (e.g., A, B, C and D) on consecutive odd (or even) lines (e.g., i−3, i−1, i+1 and i+3) and the interpolated sample X on an even (or odd) line (e.g., i). A parameter (e.g., τ) may be calculated for the interpolated sample X based on the known samples A, B, C and D per equation 16 as follows:

$$\tau = (\max(|A-B|, |B-C|, |C-D|))/2 \quad \text{Eq. (16)}$$

A blending value (e.g., v) may be calculated per equation 17 as follows:

$$v = (|Xmc - Xvf| - \tau)/\text{OFFSET} \quad \text{Eq. (17)}$$

where Xmc may be a temporally estimated value for the interpolated sample location generated by blending step 116, Xvf may be a vertically filtered estimated value for the interpolated sample location generated by the vertical filtering step 114 and OFFSET may be a user programmable number within a predetermined range (e.g., 2 to 64).

FIG. 14b generally illustrates the blending value v as a function of the parameter τ. The step 116 may generate the interpolated sample X by blending the vertical filtered value with the motion compensated value per equation 18 as follows:

$$X = Xmc + v * (Xvf - Xmc) \quad \text{Eq. (18)}$$

The parameter τ may be calculated to favor the spatially estimated value Xvf over the temporally estimated value Xmc. Two example approaches for calculating the parameter τ may be provided by equation 19 (e.g., for use in motion compensation deinterlacing) and equation 20 (e.g., for use in motion adaptive deinterlacing) as follows:

$$\tau = (3 * \max(|A-B|, |B-C|, |C-D|))/8 \quad \text{Eq. (19)}$$

$$\tau = (\max(|A-B|, |B-C|, |C-D|))/4 \quad \text{Eq. (20)}$$

Figure 15:
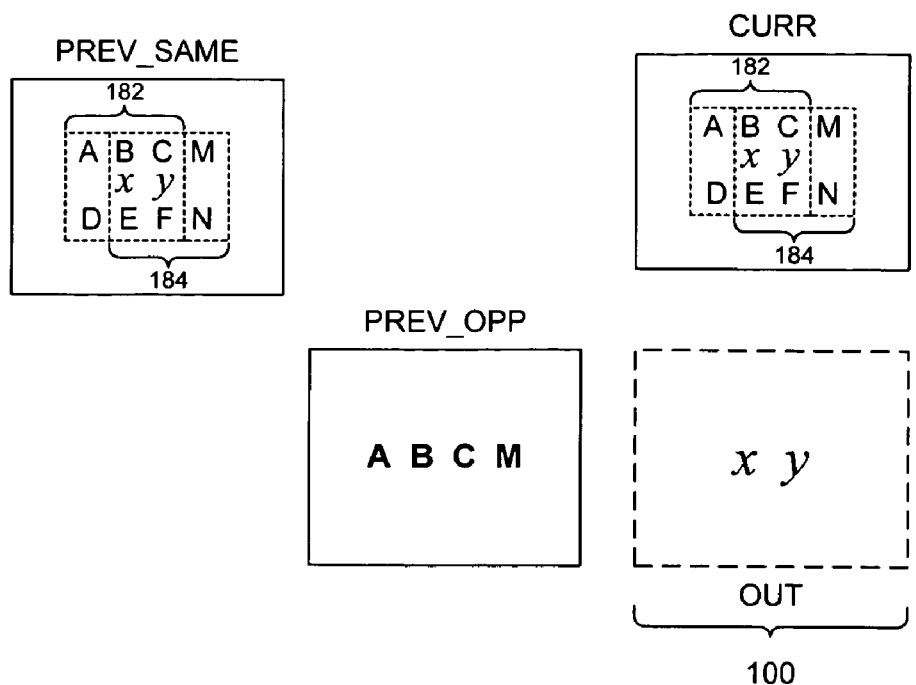
FIG. 15 is a diagram of multiple fields used in an example static check of two samples.

Referring to FIG. 15, a diagram of multiple fields used in an example static check of two samples is shown. Many overlapping operations may exist in processing two adjacent samples and/or in different stages of processing a single sample. The overlapping operations provide opportunities to reduce an overall computational complexity for the deinterlacing process. For example, assume that the interpolated sample location X has been processed for an N×M static check in a first region 182. To perform the N×M static check for a next interpolated sample location (e.g., Y) in a second region 184 (overlapping the first region 182), the static check operation may perform the following checks:

(1) CURR(M)≈PREV_SAME(M)
(2) CURR(N)≈PREV_SAME(N)
(3) |CURR(C)−PREV_OPP(C)|+|CURR(F)−PREV_OPP(C)|<p3*|CURR(B)−CURR(E)|+p4*|CURR(C)−CURR(F)|+p3*|CURR(M)−CURR(F)|, where p3 and p4 are the programmable parameters described before.

The earlier static check (for location X) from the first region 182 may be saved and then partially reused for location Y in the second region 184.

Figure 16:
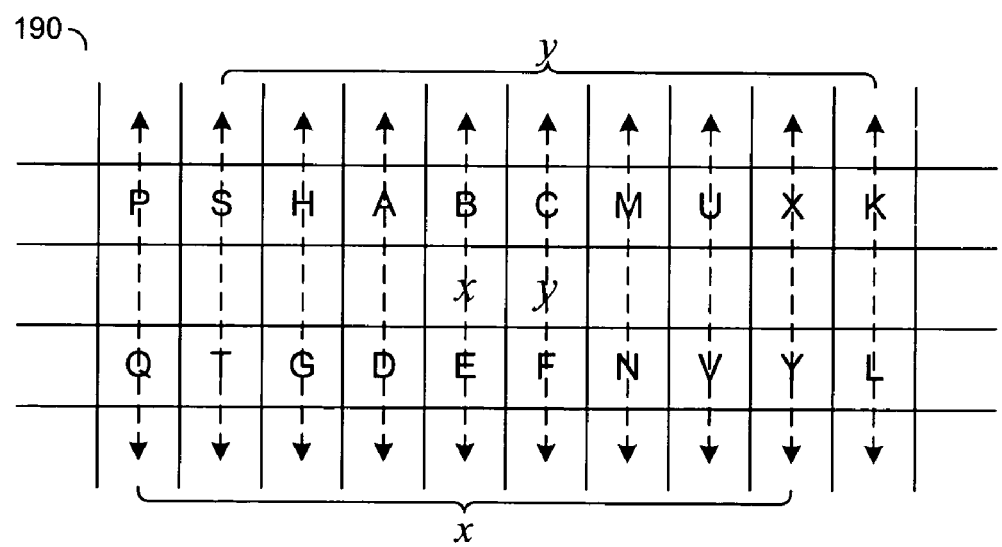
FIG. 16 is a diagram of an example horizontal stationary edge window.

Referring to FIG. 16, a diagram of an example horizontal stationary edge window 190 is shown. Assuming that the location X has been processed, to check the next location Y relative to a horizontal stationary edge, a new calculation for |K−L| may be performed and the calculated results (i) for location X and (ii) among the six variations (FIG. 6) may be reused.

Figure 17:
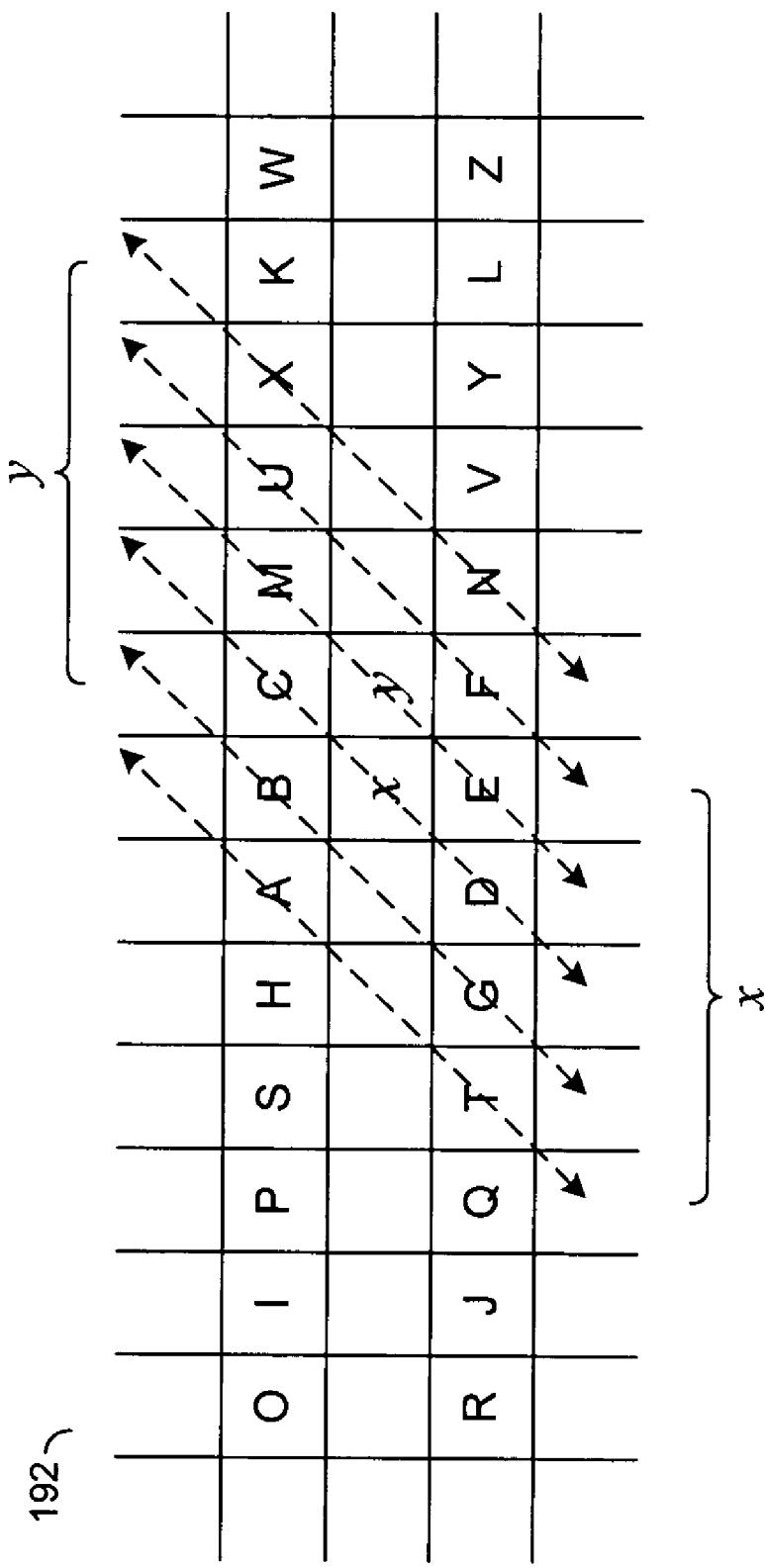
FIG. 17 is a diagram of an example edge detection window.

Referring to FIG. 17, a diagram of an example edge detection window 192 is shown. Assuming that the location X has already been processed, calculating the score d(45) for the next location Y generally involves generating an additional value for |X−N|. The values for |U−F|, |M−N|, |C−D| and |B−G| may have been calculated and stored earlier for the location X and thus may be reused for the location Y.

Referring to FIG. 18, a diagram of an example small aperture detection window 194 is shown. For each sample (i,j), a minimum value (e.g., n(j)) and a maximum value (e.g., m(j)) may be calculated per equations 21 and 22 as follows:

$$m(j) = \max([j-2], [j-1], [j], [j+1], [j+2]) \quad \text{Eq. (21)}$$

$$n(j) = \min([j-2], [j-1], [j], [j+1], [j+2]) \quad \text{Eq. (22)}$$

The values m(j−2), m(j−1), m(j), m(j+1), m(j+2) and n(j−2), n(j−1), n(j), n(j+1) and n(j+2) may then be stored for later use with interpolated sample Y. To calculate the interpolated sample X, a check for line i and line i+1 may be made for conditions defined by equations 23 and 24 as follows:

$$\max L >> n[j] << \max R \quad \text{Eq. (23)}$$

$$\min L << m[j] >> \min R \quad \text{Eq. (24)}$$

If either equation 23 or equation 24 is true for both the upper line i and the lower line i+1, directional averaging may be disabled for the interpolated sample X.

Figure 19:
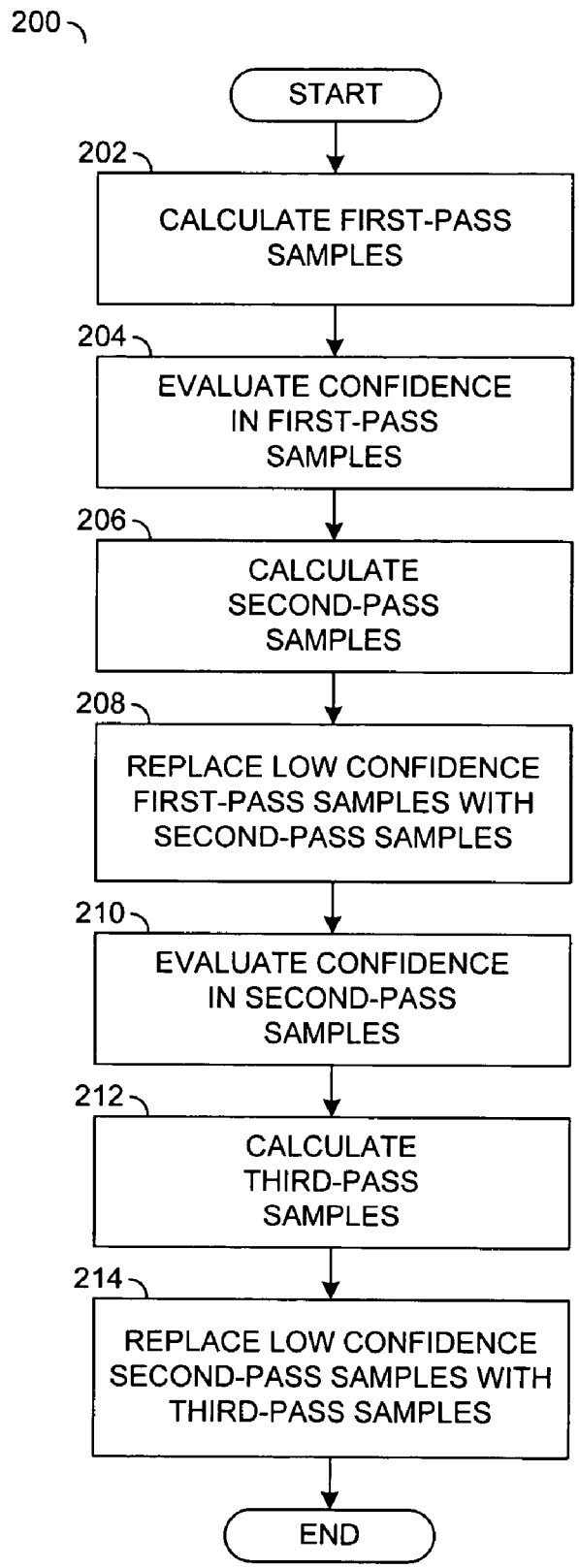
FIG. 19 is a flow diagram of an example iterative deinterlacing method.

Referring to FIG. 19, a flow diagram of an example iterative deinterlacing method 200 is shown. The method 200 generally comprise a step (or block) 202, a step (or block) 204, a step (or block) 206, a step (or block) 208, a step (or block) 210, a step (or block) 212 and a step (or block) 214. Iterative deinterlacing generally includes two or more passes through the interpolated samples to increase a quality of the interpolations. When processing the current field CURR to construct the deinterlaced frame 100, a single-pass method may estimate the missing interpolated samples (e.g., field pixels) in raster order to simplify an implementation in hardware. However, some interpolated samples may be estimated to have a certain characteristic with a high confidence (e.g., to belong to an edge with a particular directionality) while other interpolated samples within the same spatial region may only be estimated with a lesser confidence. Therefore, one or more additional passes over the estimations may be performed using the decisions made for the high confidence interpolated samples to influence the decisions made for the lower confidence neighboring interpolated samples. Multiple pass calculations may achieve a higher deinterlaced picture quality by exploiting the piece-wise spatial continuity of the video (e.g., a majority of real video is generally composed of objects spanning more than a single pixel).

The step 202 may be operational to calculate first-pass interpolated samples for the interpolated field OUT. The step 204 may be operational to generate a confidence level for each of the first-pass interpolated samples generated by the step 202. High confidence first-pass samples may be marked (e.g., a first state) and low confidence first-pass samples may be not marked (e.g., a second state). Second-pass interpolated samples may be calculated in the step 206 for each of the low confidence first-pass interpolated samples using information from the neighboring high confidence first-pass interpolated samples identified by step 204. The second-pass interpolated samples may then be substituted for the low confidence first-pass interpolated samples in the step 208 thus improving the interpolated field OUT.

A third pass for the interpolated field OUT may begin by generating confidence levels for marking/not marking the second-pass interpolated samples in the step 210. The step 212 may then calculate third-pass interpolate samples for each of the low confidence second-pass interpolated samples using information from the neighboring high confidence first-pass and high confidence second-pass interpolated samples. The low confidence second-pass interpolated samples are generally replaced by the third-pass interpolated samples. The method 200 may be continued with additional passes.

The (i) directional filtering and estimation blocks and the (ii) pixel-level switching and blending mechanisms of the deinterlacing methods 102 and 200 may be combined with spatial filtering and used to provide improved low-cost upsampling of still images. The (i) directional filtering and estimation blocks and (ii) the pixel-level and picture-level switching and blending mechanisms may also be combined with spatial filtering and (optionally) motion-estimation from other previous frames and/or fields to provide improved low-cost upsampling of progressive and/or interlaced video to increase horizontal and/or vertical resolution (e.g., super resolution video). Experimental results for the present invention generally indicate (i) that no new artifacts introduced, (ii) a clear improvement on edges compared with prior techniques and (iii) that implementation may be hardware friendly.

The function performed by the flow diagrams of FIGS. 2 and 19 may be implemented using a conventional general purpose digital computer programmed according to the teachings of the present specification, as will be apparent to those skilled in the relevant art (s). Appropriate software coding can readily be prepared by skilled programmers based on the teachings of the present disclosure, as will also be apparent to those skilled in the relevant art(s).

The present invention may also be implemented by the preparation of ASICs, FPGAs, or by interconnecting an appropriate network of conventional component circuits, as is described herein, modifications of which will be readily apparent to those skilled in the art(s).

The present invention thus may also include a computer product which may be a storage medium including instructions which can be used to program a computer to perform a process in accordance with the present invention. The storage medium can include, but is not limited to, any type of disk including floppy disk, optical disk, CD-ROM, and magneto-optical disks, ROMs, RAMs, EPROMS, EEPROMs, Flash memory, magnetic or optical cards, or any type of media suitable for storing electronic instructions.

While the invention has been particularly shown and described with reference to the preferred embodiments thereof, it will be understood by those skilled in the art that various changes in form and details may be made without departing from the spirit and scope of the invention.

The invention claimed is:

1. A method for deinterlacing a picture, comprising the steps of:
   (A) determining a protection condition by performing a static check on said picture in a region around a location interlaced with a first field of said picture, wherein said region comprises at least three-by-three sample locations;
   (B) calculating an interpolated sample at said location by temporal filtering said first field with a second field in response to said protection condition only indicating a significant increase in a vertical activity in said region due to said deinterlacing; and
   (C) calculating said interpolated sample at said location by spatial filtering said first field in response to said protection condition only indicating an insignificant change in said vertical activity in said region due to said deinterlacing
   (D) evaluating said region for a stationary horizontal edge in said picture prior to calculating said interpolated sample, wherein said stationary horizontal edge separates a spatially static content on a first side of said picture and a spatially dynamic content on a second side of said picture.

2. The method according to claim 1, wherein step (B) is in further response to said evaluation of said region indicating that said location is on said first side of said stationary horizontal edge.

3. The method according to claim 1, wherein said static checking operates on said first field and a third field having a same parity.

4. The method according to claim 1, wherein step (B) is in further response to a plurality of current samples in said region of said first field match a corresponding plurality of previous samples in said region of a third field.

5. The method according to claim 4, wherein said third field has a same parity as said first field.

6. The method according to claim 1, wherein said protection condition is based on a plurality of measures of said vertical activity in said region.

7. The method according to claim 6, further comprising the step of:
   calculating a first value of said measures of said vertical activity at said location after inclusion of said interpolated sample.

8. The method according to claim 7, further comprising the step of:
   calculating a plurality of second values of said measures of said vertical activity within said region other than at said location.

9. The method according to claim 8, further comprising the step of:
   asserting said protection condition where said first value is proximate said second values.

10. A method for deinterlacing a picture, comprising the steps of:
    (A) determining a protection condition by performing a static check on said picture in a region around a location interlaced with a first field of said picture;
    (B) calculating an interpolated sample at said location by temporal filtering said first field with a second field in response to said protection condition only indicating significant vertical activity; and
    (C) evaluating said region for a stationary horizontal edge in said picture in response to said protection condition only indicating insignificant vertical activity, wherein said stationary horizontal edge separates a spatially static content on a first side of said picture and a spatially dynamic content on a second side of said picture.

11. The method according to claim 10, further comprising the step of:
calculating said interpolated sample at said location by spatial filtering said first field in response to said evaluation of said region indicating that said location is on said second side of said stationary horizontal edge.

12. The method according to claim 10, further comprising the step of:
calculating said interpolated sample at said location by spatial filtering said first field in response to said evaluation of said region indicating that no stationary horizontal edge is present in said region.

13. The method according to claim 10, further comprising the step of:
calculating said interpolated sample at said location by temporal filtering said first field with a second field in response to said evaluation of said region indicating that said location is on said first side of said stationary horizontal edge.

14. The method according to claim 10, further comprising the step of:
calculating said interpolated sample at said location by directional filtering.

15. A method for deinterlacing a picture, comprising the steps of:

(A) determining a protection condition by performing a static check on said picture in a region around a location interlaced with a first field of said picture;

(B) calculating an interpolated sample at said location by temporal filtering said first field with a second field in response to said protection condition only indicating a significant increase in a vertical activity in said region due to said deinterlacing; and (C) calculating said interpolated sample at said location by blending in response to said protection condition only indicating an insignificant change in said vertical activity in said region due to said deinterlacing, (D) evaluating said region for a stationary horizontal edge in said picture, wherein said stationary horizontal edge separates a spatially static content on a first side of said picture and a spatially dynamic content on a second side of said picture.

16. The method according to claim 15, wherein said region comprises at least three-by-three sample locations.

17. The method according to claim 15, wherein step (B) is in further response to said evaluation of said region indicating that said stationary horizontal edge exists.

18. The method according to claim 17, wherein step (B) is in further response to said location being on said first side of said stationary horizontal edge.

\* \* \* \* \*